Inventor:
WALTER KÖHLER
By Michael S. Striker
Attorney

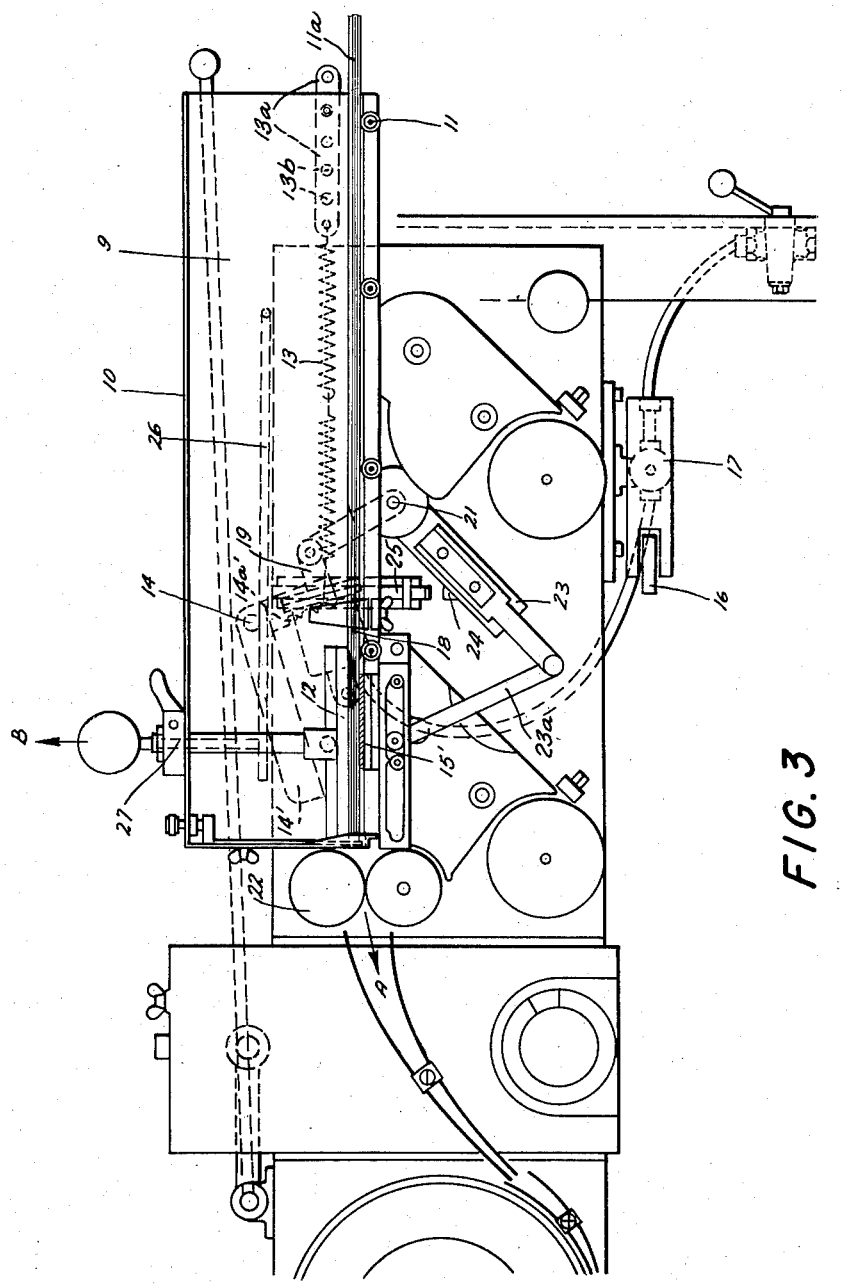

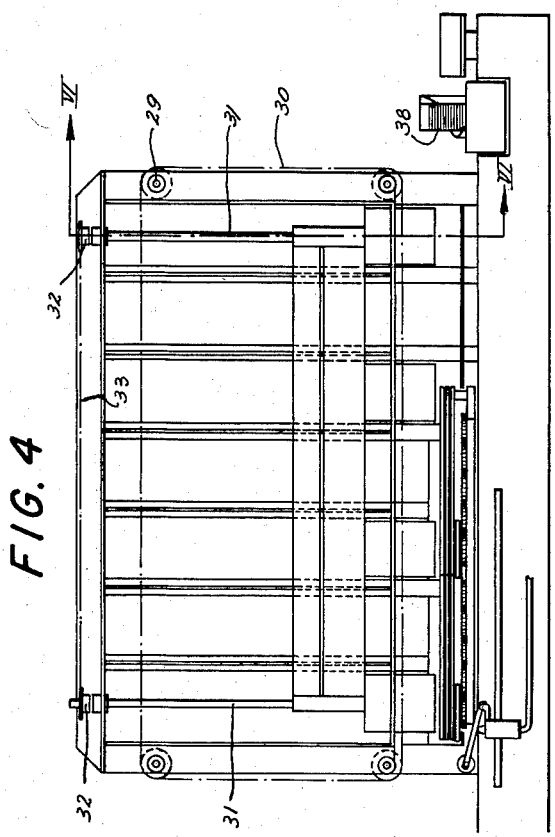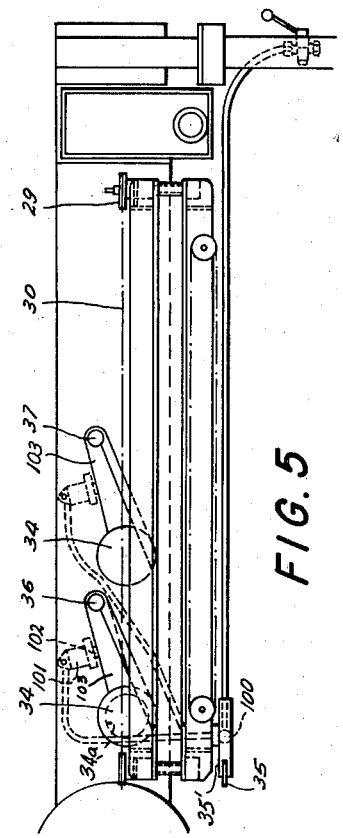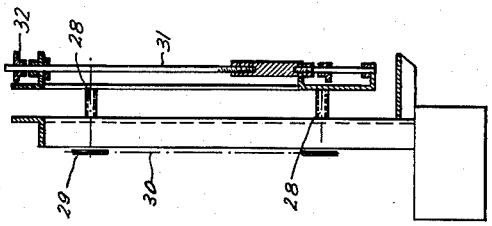

Feb. 7, 1961 W. KÖHLER 2,970,619
MACHINE FOR APPLYING STRIPS OF VENEER
OR MOLDING TO THE EDGES OF AN
ELONGATED WORKPIECE
Filed July 5, 1957 7 Sheets-Sheet 6

Inventor:
WALTER KÖHLER
By
Michael S. Striker
Attorney

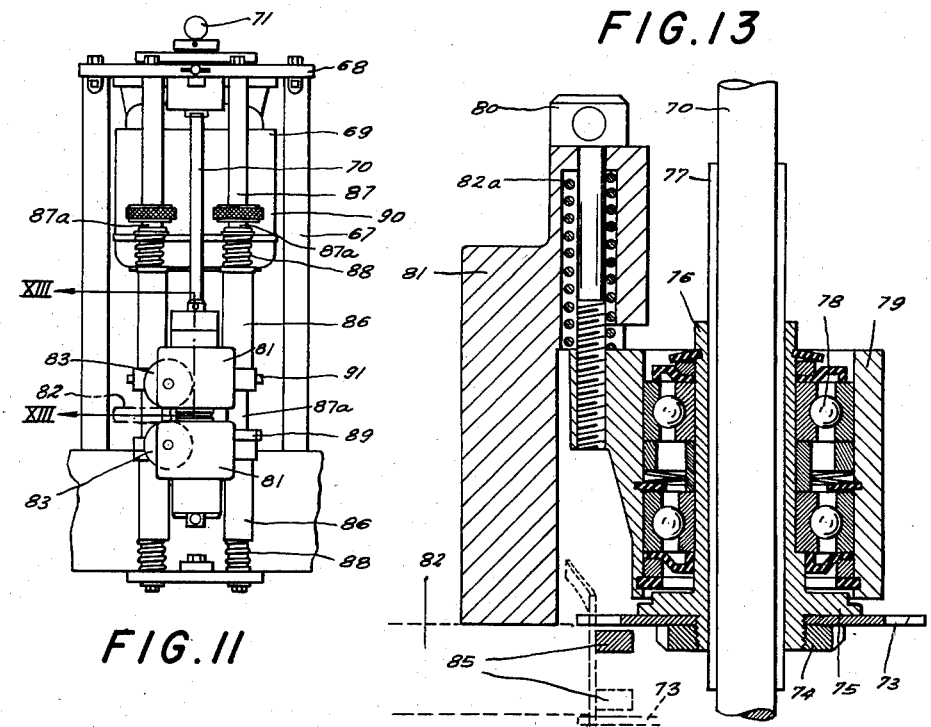

United States Patent Office 2,970,619
Patented Feb. 7, 1961

2,970,619

MACHINE FOR APPLYING STRIPS OF VENEER OR MOLDING TO THE EDGES OF AN ELONGATED WORKPIECE

Walter Köhler, Gutersloh, Germany, assignor to Erich Klessmann, Gutersloh, Germany Filed July 5, 1957, Ser. No. 670,101

7 Claims. (Cl. 144—279)

The present invention relates to machines used in the manufacture of furniture and the like.

More particularly, the present invention relates to machines used for applying to a workpiece in the form of a wooden member a strip of veneer.

One of the objects of the present invention is to provide a machine of the above type which is capable of applying to a workpiece not only a strip of veneer but also a strip of molding.

Another object of the present invention is to provide a machine of the above type which has an output which is much higher than known machines of the same type and which is capable of applying strips to a pair of opposed edges of a workpiece simultaneously.

A further object of the present invention is to provide a machine which is of relatively small height and still has a very high output.

An additional object of the present invention is to provide a machine of the above type which is capable of applying to a workpiece a layer of adhesive which is of uniform controlled thickness.

Still another object of the present invention is to provide in a machine of the above type a magazine cooperating with a means for supplying automatically from the magazine strips which are to be joined to the workpiece.

A still further object of the present invention is to provide in a machine of the above type an apparatus capable of pressing the strips against the workpiece with both heat and pressure while simultaneously transporting the workpiece.

A still additional object of the present invention is to provide a pressing and heating means of the above type which is capable of automatically adjusting itself to variations in an endless band thereof resulting from the heating of the endless band.

It is also an object of the present invention to provide in a machine of the above type a trimming means for trimming excess material of a strip from a workpiece, this trimming means being capable of automatically adapting itself to variations in the thickness of the workpiece.

The objects of the present invention also include the provision of structure capable of accomplishing all of the above objects and at the same time composed of simple and ruggedly constructed elements which are very reliable in operation and which are relatively inexpensive to manufacture and assemble.

With the above objects in view, the present invention mainly consists of a machine for applying strips of veneer or molding to edges of a workpiece, this machine including a first plurality of means arranged one behind the other along one side of a path along which a workpiece moves and a second plurality of means arranged one behind the other along the other side of the path along which the workpiece moves, and a pair of guide means respectively located adjacent the first and second plurality of means for guiding a workpiece for movement along the predetermined path. Each of the plurality of means includes a means for supplying adhesive, a means for feeding strips to be joined to the workpiece, means for pressing strips against a surface of a workpiece to which adhesive has been applied, and a trimming means for trimming excess material of the strip from the workpiece. One of the plurality of means together with the guide means adjacent thereto is carried by a carriage for adjustable movement toward and away from the other of the plurality of means and the guide means associated therewith, so that in this way the machine is adjustable to accommodate workpieces of differing widths.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a fragmentary, partly diagrammatic plan view on an enlarged scale as compared to Fig. 1 of a magazine structure used for supplying strips of veneer, Fig. 3 showing many details which are not visible in Fig. 1;

Fig. 4 is an elevational view of a magazine forming part of the machine of Fig. 2 and adapted to hold a supply of molding strips;

Fig. 5 is a plan view of the structure of Fig. 4;

Fig. 6 is a sectional elevational view taken along line VI—VI of Fig. 4 in the direction of the arrows;

Fig. 11 is an elevational view of a trimming means according to the present invention;

Fig. 12 is a plan view of the structure of Fig. 11;

Fig. 13 is a sectional view on an enlarged scale taken along line XIII—XIII of Fig. 11 in the direction of the arrows; and Fig. 14 is a plan view of a presser member which cooperates with the trimming means.

Figure 1:
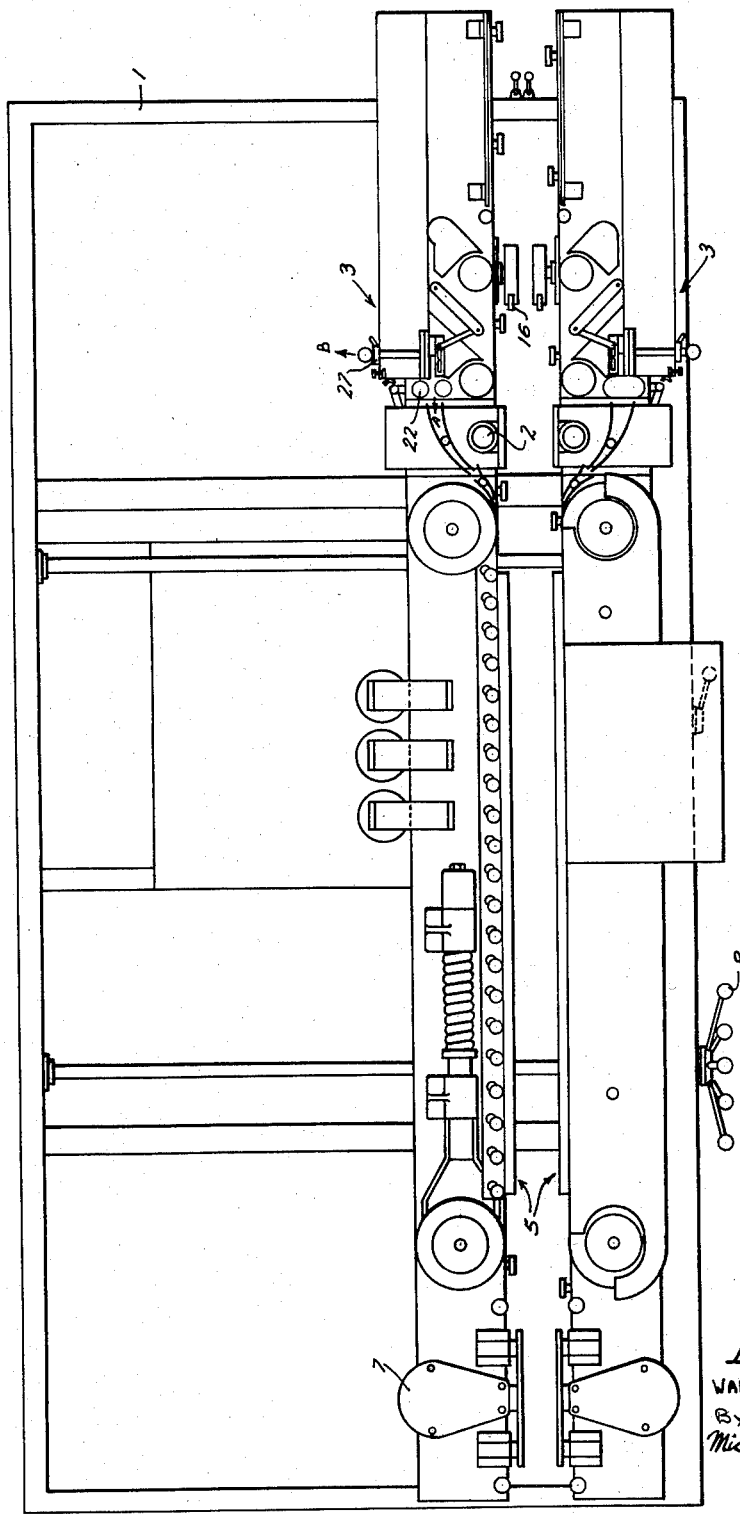
Fig. 1 is a diagrammatic plan view of a machine according to the present invention used for applying strips of veneer to the edges of a workpiece.
Figure 2:
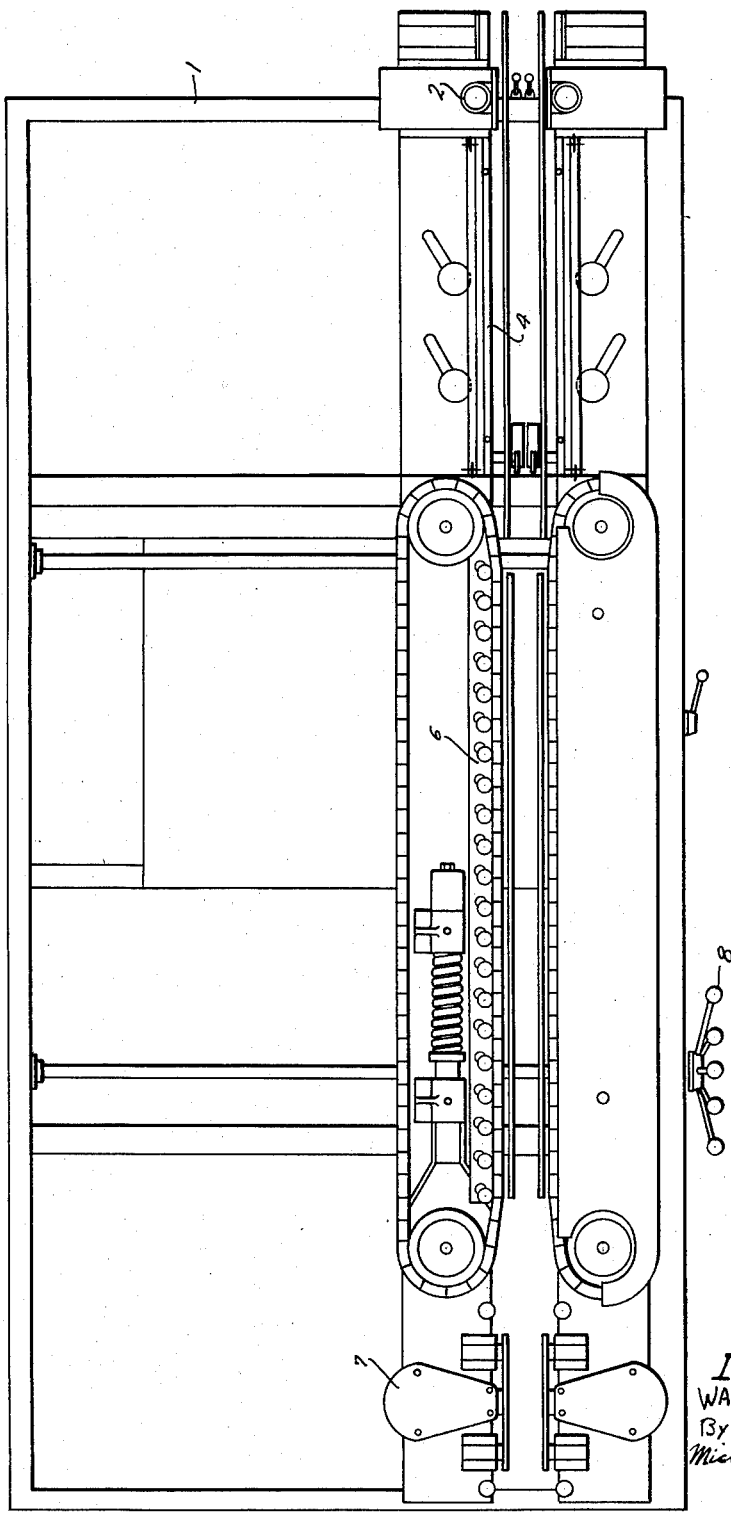
Fig. 2 is a diagrammatic plan view of a machine similar to that of Fig. 1 but capable of applying strips of molding to the edges of a workpiece.

Fig. 1 illustrates a machine according to the present invention for joining strips of veneer to the edges of a workpiece in the form of an elongated board or the like, and Fig. 2 shows the same machine as used for joining molding to the edges of a workpiece. Both of these machines which are illustrated in Figs. 1 and 2 include a machine frame 1, and the workpiece is adapted to move along the machine in a predetermined path which extends from the right end of Figs. 1 and 2 to the left end thereof, as viewed in Figs. 1 and 2. A plurality of means are arranged on each of these machines on opposite sides of the path along which the workpiece moves. Thus, with the machines of Figs. 1 and 2 there are provided on opposite sides of the path of the workpiece a pair of adhesive supply means 2, a pair of veneer supplying magazines 3 in the case of Fig. 1 and a pair of molding supplying magazines 4 in the case of Fig. 2, a pair of means for pressing the strip against the workpiece, this means being indicated at 5 in Fig. 1 and at 6 in Fig. 2, and a pair of trimming means 7. Along each row of means is located a guide rail for guiding the workpiece along the predetermined path of movement thereof. As is shown in Figs. 1 and 2 the plurality of means which are arranged one behind the other along the path of movement of the workpiece adjacent to the lower edge of Figs. 1 and 2 as well as the guide rail associated with this plurality of means are carried by a carriage which is shiftable toward and away from the other of the plurality of means so that in this way workpieces of different widths may be accommodated, and a manually operable adjusting means 8 is provided for shifting the carriage with all of the parts carried thereby. Thus, with the machine of the invention an elongated board or the like may be located in a horizontal plane and while moving continuously through the machine may have strips applied to its opposite side edges simultaneously, and the machine is capable of being adapted to boards of different widths by operation of the adjusting means 8.

The magazine means 3 of the machine of Fig. 1 includes, as is shown in Fig. 3, a receptacle 9 for holding a supply of veneer strips. This receptacle is limited on one side by a wall 10 and on the other side by rollers 11 (Fig. 3). The receptacle 9 is open at its discharge end. A pressure plate 12 is arranged within the magazine at the portion thereof through which the strips move when they are removed from the magazine, and a spring 13 acts on this pressure plate. Actually, the left end of the spring 13, as viewed in Fig. 3, is connected to a bell crank lever 14' which is pivotally supported on a vertical pivot pin 14 for turning movement about a vertical axis, and the left end of this lever bears against the pressure plate 12. The spring 13 urges the pressure plate 12 toward a counter pressure plate 15a. The several strips of veneer 11a are introduced by hand between the plates 12 and 15, and the outermost strip of the stack of strips, that is, the lowermost strip, is held between these plates in engagement with the limiting rollers 11.

The means for moving a strip out of the magazine of Fig. 3 includes a feeler member in the form of a roller 16 which is moved downwardly by the workpiece when the latter is introduced into the machine, this downwardly moving roller moving a plate which turnably supports the roller so as to actuate a valve 17 which communicates with a cylinder 18 containing a fluid medium such as air or liquid under pressure. Within the cylinder 18 is a piston whose piston rod 19 is pivotally connected with a lever 20 which is turnable about the pivot pin 21 which is fixedly carried by the magazine. When the lever 20 turns the plate 15 which is provided at its face directed toward a strip of veneer with a plurality of sharp points 15', it pushes these small sharp points into the strip of veneer and then this plate 15 is shifted so as to transport the lowermost strip 11a of veneer in the direction of arrow A of Fig. 3 up to the transport rolls 22. These rolls then continue the transporting of the strip of veneer to the workpiece which in the meantime has been provided with a coating of adhesive at its edge surface which is to receive the strip of veneer. In order to guarantee a faultless feeding of strips of veneer from the magazine, the force of the spring 13 urging the plate 12 against the stack of strips is eliminated at this time.

This result is brought about by providing at an intermediate portion of a lever 23 which turns with the lever 20 a projection 24 which during the turning of the lever 23 about the pivot pin 21 in a clockwise direction, as viewed in Fig. 3, engages a push rod 25 which in turn is connected through a lever 26 with another push rod 27, the latter being fixed to the plate 12. The arrangement is such that when the lever 23 turns in the manner described above the plate 12 will be moved in the direction of arrow B of Fig. 3 through a distance of approximately 3 centimeters against the action of the spring 13. The lever 14' which cooperates with the left end of the spring 13, as viewed in Fig. 3, is provided with a series of notches 14a' adapted to selectively receive this left end of the spring 13, while the right end of the latter is adapted to selectively cooperate with one of the plurality of openings 13b in a bar member 13a fixed to the magazine, so that by selecting the portions of the lever and bar member with which the ends of the spring respectively cooperate it is possible to regulate the tension of the spring.

Of course, during clockwise turning of the levers 20, 23, in response to movement of the piston rod 19, to the right, as viewed in Fig. 3, out of the piston holding cylinder 18, the link 23a connected at one end to the plate 15 and at the other end to the lever 23 moves so as to shift the pressure plate 15a together with a strip to the left, as viewed in Fig. 3.

For the case where strips of veneer are not joined to the workpiece, and instead strips of molding are joined thereto, the machine of Fig. 2 is used and in this case the magazine which is illustrated in detail in Figs. 4, 5 and 6 is used. This magazine is capable of being used for moldings of different sizes since the width of the magazine may be adjusted by the spindles 28 (Fig. 6). These spindles 28 are respectively connected with sprocket wheels 29 which in turn cooperate with a sprocket chain 30 which interconnects all of the sprocket wheels with each other in the manner shown diagrammatically in Fig. 4. Thus, when one of the spindles 28 is turned the entire width of the magazine is uniformly adjusted, these spindles 28 threadedly cooperating with opposite side walls of the magazine so that when the spindles are turned these side walls approach or recede from each other.

This magazine is also adjustable in height, and for this purpose spindles 31 are provided which also are connected respectively to sprocket wheels 32 which are joined to each other and cooperate with each other through a sprocket chain 33 (Figs. 4 and 6). Thus, when one of the spindles 31 is turned the height of the magazine can be regulated. In this way it is possible with the machine of the invention to join to a workpiece moldings of different widths and heights.

The removal of the stack or molding strips arranged one above the other within the magazine takes place through the medium of discharge rollers 34 which are carried by levers 103 which are in turn pivotally supported by the magazine as at 36, 37 and of which at least two are distributed along the length of the magazine. In the same way as with the embodiment of Figs. 1 and 3, when a workpiece is introduced into the machine it engages a feeler member in the form of a roller 35 in order to depress the latter, and this roller 35 is carried by a plate 35' which when it is depressed actuates a valve 100 of a cylinder 101 having therein a fluid under pressure such as air or a liquid fluid. The piston of this cylinder 101 has a piston rod 102 which engages a lever 103 turnably supported by the magazine and carrying one of the rollers. Thus, as may be seen from Fig. 5, a pair of rollers 34 are in engagement with the lowermost strip within the magazine, and these rollers 34 are respectively carried by levers 103 which are respectively supported for turning movement by the pivot pins 36 and 37. The valve 100 which is actuated by depression of the roller 35 admits air or liquid under pressure into the cylinders 101 shown in dotted lines adjacent to the levers 103 which carry the rollers 34, and the pistons then move out of the cylinders against these levers so as to urge the rollers 34 against the strip. The turning rollers 34 thus move the lowermost strip out of the magazine. The first of the rollers 34 is driven by a suitable drive means, e.g. by a motor 34a. The driving of this roller 34 continues the transportation of the strip of molding in the direction of movement of the workpiece after the strip has left the magazine.

Figure 7:
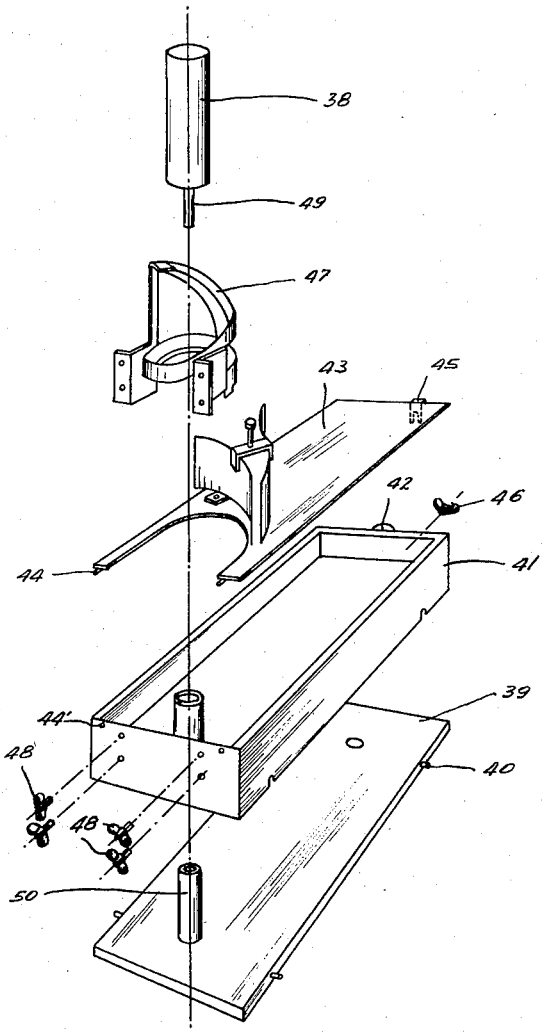
Fig. 7 is an exploded perspective view of a structure for supplying an adhesive.

Before a strip of veneer or molding is joined to an edge of a beam of wood which is to form part of a piece of furniture, for example, it is necessary to provide a layer of adhesive on this edge, and the structure for supplying the adhesive is shown in detail in Fig. 7. This structure includes a base plate 39 and an adhesive applying roller 38 which is turnable about a vertical axis and which is driven by a suitable drive means which is not illustrated and which is located beneath the plate 39. The base plate 39 includes at its opposite side edges pins 40 fixed to the base plate 39 and adapted to enter into mating cutouts formed in the lower side edges of the side walls of the receptacle portion 41 of the reservoir for the adhesive, so that between this receptacle portion 41 and the base plate 39 there is provided a fluid-tight closed connection. This receptacle portion 41 is double-walled so as to be capable of receiving in its interior a cooling medium and it is provided with an outlet and inlet nozzle 42 through which the cooling medium may be inserted into or removed from the walls of the receptacle portion 41. The reservoir formed by parts 39 and 41 is capable of being closed by a cover 43 so that during use of the adhesive supply means no dust or other foreign matter is capable of falling into the reservoir of adhesive material.

In order to fix the cover 43 in its covering position it is provided at its end adjacent to the roller 38 with pins 44 which extend into mating openings 44' of the receptacle portion 41, while the other end of the cover 43 is provided with a clamping strip 45 which is fixed to the receptacle portion 41 by a wing nut 46.

The adhesive supply roller 38 is provided at its outer surface with a coating of a plastic material, and this coating is preferably grooved, as is indicated diagrammatically at the lower right portion of Fig. 4. This supply roller 38 has a spiral member 47 coiled about it for controlling the thickness of the layer of adhesive material which is supplied by the roller 38, and this spiral member 47 is fixed by wing screws 48 (Figure 7) to the receptacle portion 41. The roller 38 has an axle portion 49 fixed coaxially thereto and extending downwardly therefrom and this axle portion 49 is turnable in the bearing 50 which is carried by the base plate 39.

The reservoir is filled to a predetermined height with the liquid adhesive and the roller is partly submerged in the liquid. The turning of the roller causes the adhesive to be distributed uniformly by the spiral member 47 over the outer surface of the roller 38 and along its entire length. The chosen distance of the spiral member 47 from the outer surface of the roller 38 determines the thickness of the layer of adhesive which is applied to the workpiece.

Figure 8:
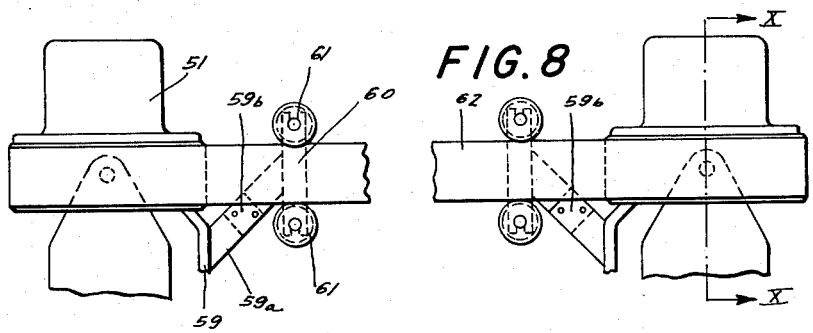
Fig. 8 is a fragmentary elevational view of a means for pressing a strip against a workpiece with heat and pressure.
Figure 9:
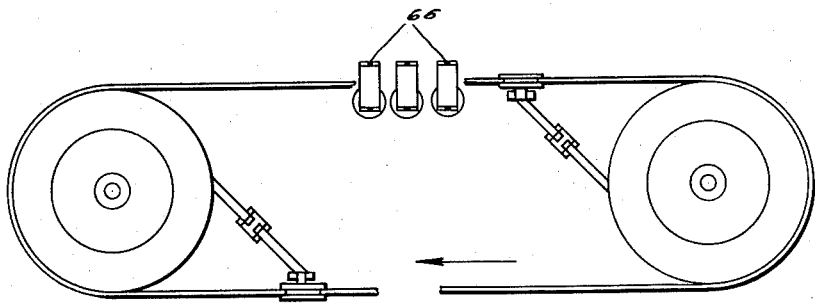
Fig. 9 is a plan view of the structure of Fig. 8.
Figure 10:
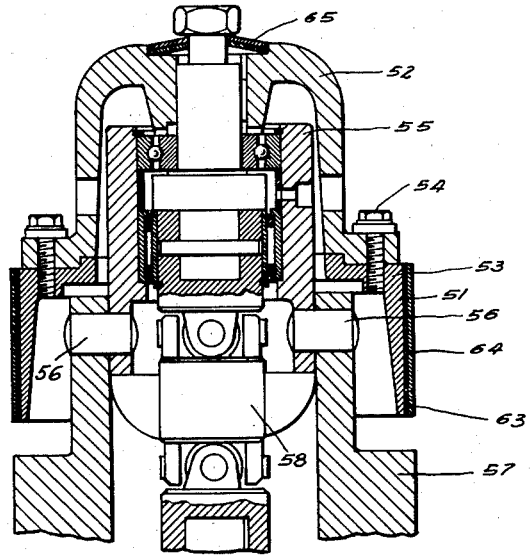
Fig. 10 is a sectional view on an enlarged scale taken along line X—X of Fig. 8 in the direction of the arrows.

The strips of the veneer or molding are pressed against the edge of the board by a band which is heated, and in order to provide the proper bond between the strip and the board is necessary that this band be heated to a temperature of about 350° C. This heating of the band which may be made of steel, for example, produces a non-uniform lengthening of the band so that the edges of the band tend to bulge with respect to the rest of the band and tend to pull the band off the pulley which moves the band. The lengthening of such a band at the edges thereof due to the increase in temperature of the band presents difficulties which cannot be avoided simply by providing a pulley which is turnable about an axis parallel to its own axis. In accordance with the present invention a band guiding arrangement is provided where the pulley is turned automatically by the band itself. Figs. 8, 9 and 10 show the structure of the invention for producing these results.

Thus, as may be seen by referring to these figures, the pulley 51 is composed essentially of an upper bell-shaped part 52 and an inner pulley member 53, these parts 52 and 53 being connected together by the screw members 54. A housing 55 carries the pulley 51 and is connected to a stationary housing part 57 by pivot pins 56 so that the pulley support 55 is capable of tilting about the common axis of the pivot pins 56 shown in Fig. 10. It should be noted that the stationary part 57 does not extend completely about the support 55. The top end of the stationary part 57 is provided with cutouts which permit turning of the part 55 about the axes of the pins 56. The pulley 52 is driven from a suitable drive shaft through a double ball joint 58 similar to a universal joint, so that the pulley is capable of turning in two directions, that is, the pulley is capable of tilting in two directions. An arm 59 is fixed to the pulley support 55 and is provided with a holder 60 for a pair of feeler rollers 61 which respectively engage the upper and lower edges of the steel band 62 and cooperate with these upper and lower edges. In order to obtain the proper guiding, it is necessary that these feeler rollers engage the band 62 at the run thereof which engages the strip. These rollers 61 are themselves adjustable in the holder 60. With the construction shown in Figs. 1 and 8–10 the band 62 forms a secondary winding of a transformer, and for this reason it is necessary to provide an insulation of the band with respect to the stationary support 57. For this reason the part 59a of the arm 59 is formed of a plurality of pieces which are connected together and insulated from each other by a layer of insulation 59b. In order to insulate the pulley from the band the pulley is provided with a layer of insulation 63 at the outer surface of its inner part 53, and this insulation may be mica. An outer pulley casing 64 is shrunk onto the layer of mica. For the purpose of equalizing the expansion of the pulley 52 and the drive shaft a dished spring assembly 65 is provided on top of the pulley 52 and is pressed upon by a nut threaded onto the drive shaft.

In order to heat the band 62 a plurality of separate primary coils 66 are provided, as indicated in Fig. 9. By energizing one or more of the primary coils 66 it is possible to control the temperature of the band, and with this arrangement it is possible to provide the band on one side of the machine with a temperature different from the band on the other side of the machine, so that with the machine of the invention strips of veneer of different thickness, for example, can be simultaneously joined to opposed edges of a workpiece. In order to protect the primary windings from the heat of the band 62 it is of advantage to provide a metal screening sheet between the band 62 and the walls of the primary coils. Although the band 62 may be made of pure steel, it has proved to be of particular advantage to use a band which is provided with a copper plating on one or both of its faces. A 15% copper plating has proved to be particularly successful. Also, it is possible to use instead of a steel band a band composed of an alloy of copper and silicon or copper and chromium. In the event that the heat is derived from electrodes arranged above and below the seam of adhesive and heated with a high frequency current, the band no longer serves as a source of heat and in this event is used solely for transporting purposes and takes the form of a transporting chain, as is indicated in Fig. 2. After a strip is joined to the furniture piece or the like, the edges of the strip which extend beyond the opposite faces of the workpiece must be removed. It is extremely difficult to properly set a trimming device so as to properly trim the excess material of the strip because the thickness of the wooden beam or the like has a relatively large tolerance. For example, wooden boards have a lesser or greater amount of moisture therein depending upon the manner in which they are stored, and the moisture content of such a wooden board influences its thickness. With the structure of the invention it is possible to provide a trimming means which overcomes these drawbacks.

This structure is illustrated in Figs. 11–14 and includes a supporting frame 67 which terminates at its top end in a top plate 68. An electric driving motor 69 is fixed to the underside of this top plate and through a suitable belt and pulley drive this motor drives a vertical spindle 70. The transmission ratio of this drive is such that the spindle 70 is driven at a speed which is three times that of the motor. The spindle 70 terminates at its top end in a spherical member 71 while the pulley and belt drive from the motor to the spindle is covered by the housing member 72 (Fig. 12).

The spindle 70 carries a pair of horizontal cutters 73 in the form of saw blades or the like which are circular. In Fig. 13 the upper cutter 73 is shown in section while only the left portion of the lower cutter 73 is shown in dot-dash lines in Fig. 13. A nut 74 serves to connect each cutter 73 to a support means 75 formed through with a bore through which the spindle 70 passes, as indicated in Fig. 13. The bored axial portion 76 of the support means 75 receiving the spindle 70 is formed with a pair of diametrically opposed axial grooves which respectively receive keys 77 extending axially along and fixed to the spindle 70, the support means 75 being slidable along the shaft 70 but being incapable of rotating with respect thereto as a result of the cooperation of the keys 77 with the grooves of the support means 75. Ball or roller bearings 78 serve to turnably support the support means 75 in a housing 79 which is connected by a screw member 80 with a carrier member 81 which cooperates with the workpiece. In order to avoid a frictional rubbing between the carrier 81 and the workpiece 82 (Fig. 13), this carrier 81 turnably carries at its lower end a feeler roller 83 adapted to engage the top face of the workpiece 82. Of course, the lower carrier 81 is provided with a roller 83 (Fig. 11) adapted to engage the underside of the workpiece. In order to provide a proper connection between the carrier 81 and the housing 79 a spring 82a is coiled about the screw member 80 within a bore of the carrier 81, and this spring guarantees a proper cooperation between the housing 79 and the carrier 81. By turning the screw 80 it is possible to adjust the elevation of the roller 83 with respect to the cutter 73, so that this cutter can be set to cut very accurately at the top face of the workpiece 82 in the case of the structure shown in Fig. 13, the lower assembly operating in the same way to adjust the lower cutter to operate exactly at the lower face of the workpiece.

In order to prevent the application of undesirably large stresses to the strip of veneer or molding 84 during the trimming thereof, a pressure member 85 (Figs. 13 and 14) is provided to press the strip against the edge of the workpiece 82 during the trimming of the strip. These pressure members 85 are respectively carried by the upper and lower housings 79. In order to be able to move the work easily into the space between the two pairs of pressure members 85 which are respectively located on opposite sides of the workpiece, these members are provided with curved ends shown in Fig. 14, and these ends are curved away from the strips.

Each of the housings 79 has a pair of tubular guide members 86 of cylindrical configuration fixed thereto, and a pair of columns 87 are carried by the frame 67 and are parallel to the spindle 70, these columns respectively extending through the tubular guides 86 in the manner shown in Fig. 11. These tubular members 86 are capable of moving along the columns 87 against the force of coil springs 88 which are coiled about the columns and which respectively engage ends of the tubular members 86.

The lower pair of tubular members 86 of Fig. 11 slide directly on the columns 87 and are urged upwardly by the lower pair of springs 88 shown in Fig. 11. The upward movement of these lower members 86 is limited by a pair of collars 89 fixed to the columns 87 and located respectively over the lower pair of tubular guide members 86. The upper pair of tubular members 86 do not slide directly upon the columns 87 and instead slide upon two sleeves 87a respectively located between the columns 87 and the upper pair of tubular guides 86 and fixed to the columns 87 by the nuts 90 which have knurled outer surfaces. These sleeves are respectively provided with elongated axially extending slots and the tubular members 86 are provided with screw members 91 which extend into these slots so as to limit the vertical movement of the upper pair of tubular members 86.

With this structure of Figs. 11–14, when it is desired to trim a strip the nuts 90 are loosened and the upper cutter is raised to an elevation corresponding to the thickness of the workpiece, which is to say the upper cutter is located at the proper distance above the lower cutter. The nuts 90 are tightened so as to maintain the parts in the adjusted position. The feeler rollers 83 cooperate with the upper and lower faces of the workpiece so as to automatically move the cutters up and down in response to any change in the thickness of the workpiece so that each cutter automatically cuts the excess portion of the strip flush with the face of the work beyond which this excess portion extends. By adjusting the position of the collars 89 on the columns 87 it is possible to adjust the elevation of the lower cutter when necessary.

It will be understood that each of the elements described above, or two or more together, may also find a useful application in other types of furniture manufacturing machines differing from the types described above.

While the invention has been illustrated and described as embodied in machines for applying a strip to an edge of a workpiece, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine for applying strips of veneer or molding to the longitudinal edges of an elongated workpiece, in combination, a first and a second plurality of means respectively arranged one behind the other along and at the opposite sides of a predetermined path, said first and second plurality of means located opposite to and spaced from each other and each thereof including an adhesive supplying means, a strip supplying means, and a means for pressing a strip against a longitudinal edge of a workpiece to which adhesive has been supplied, the pressing means of said first and second plurality of means respectively adapted to press strips against two opposite longitudinal edges of a workpiece, each of said adhesive supplying means including a roller turnable about a vertical axis and a spiral member coiled about and spaced from said roller, the distance between the spiral member and the roller controlling the thickness of adhesive which is applied to an edge of the workpiece, each of said strip supplying means including a feeler member located in the path of movement of a workpiece to be engaged thereby for actuation of the respective strip supplying means, and each of said means for pressing a strip against an edge of the workpiece including an endless band which also functions to transport the workpiece; and first and second guide means respectively located adjacent to said first and second plurality of means along and at the opposite sides of said path for guiding a workpiece for movement longitudinally along said path past said first and second plurality of means, said first and second guide means located in a common plane whereby a workpiece may move longitudinally along said path on said first and second guide means and between said first and second plurality of means so that strips may be applied simultaneously to opposite longitudinal edges of a workpiece.

2. In a machine as recited in claim 1, said endless band forming a secondary of a transformer so as to be heated for applying a strip against a workpiece with heat and pressure.

3. In a machine as recited in claim 1, heating means cooperating with said means for pressing a strip against the workpiece, said heating means being in the form of electrodes located above and below the endless band and heated with a high frequency current.

4. In a machine for applying a strip of veneer or molding to an edge of a workpiece, in combination, a reservoir adapted to contain an adhesive therein; an adhesive applying roller having an outer plastic coating formed with grooves and turnably supported at said reservoir for receiving adhesive therefrom; and a spiral member carried by said reservoir and coiled about and spaced from said roller, the distance between said spiral member and said roller controlling the thickness of the layer of adhesive on said roller, so that a predetermined thickness of adhesive will be applied to a workpiece.

5. In a machine for applying a strip of veneer or molding to an edge of a workpiece, in combination, a reservoir adapted to contain an adhesive therein; an adhesive applying roller having an outer plastic coating formed with grooves and turnably supported at said reservoir for receiving adhesive therefrom; and a spiral member carried by said reservoir and coiled about and spaced from said roller, the distance between said spiral member and said roller controlling the thickness of the layer of adhesive on said roller, so that a predetermined thickness of adhesive will be applied to a workpiece, said reservoir having a double-walled portion adapted to receive a cooling medium in its interior and said reservoir having surfaces formed with cutouts which receive projections affixed to a base plate of the reservoir for providing a closed connection between the base plate and side walls of the reservoir.

6. In a machine for applying a strip of veneer or molding to an edge of a workpiece, in combination, a reservoir adapted to contain an adhesive therein; an adhesive applying roller having an outer plastic coating formed with grooves and turnably supported at said reservoir for receiving adhesive therefrom; a spiral member carried by said reservoir and coiled and spaced from said roller, the distance between said spiral member and said roller controlling the thickness of the layer of adhesive on said roller, so that a predetermined thickness of adhesive will be applied to a workpiece; and cover means covering said reservoir to prevent dust and the like from falling therein.

7. In a machine for applying strips of veneer or molding to the longitudinal edges of an elongated workpiece, in combination, a plurality of first means arranged one behind the other along a predetermined substantially horizontal path on one side thereof, said plurality of first means including an adhesive supplying means, a strip supplying means, and a means for pressing a strip against a longitudinal edge of a workpiece to which adhesive has been supplied; first substantially horizontal guide means located adjacent said plurality of first means along said path on the same side thereof as said plurality of first means for guiding a workpiece for longitudinal movement substantially horizontally along said path past said plurality of first means; a plurality of second means also arranged one behind the other along said path at a side of the latter opposite from said plurality of first means, said plurality of second means being located at substantially the same elevation as said plurality of first means and including adhesive supplying means, a strip supplying means, and means for pressing a strip against an edge of a workpiece to which adhesive has been supplied, the latter edge of the workpiece being opposite from the edge thereof to which a strip is applied by said plurality of first means; second guide means extending along said path adjacent to said second plurality of means on the same side of said path as said plurality of second means for guiding a workpiece longitudinally along said path past said second plurality of means; and carriage means supporting said second plurality of means and said second guide means for substantially horizontal movement transversely of said path toward and away from said plurality of first means and said first guide means so that the distance between said first plurality of means and first guide means, on the one hand, and said second plurality of means and second guide means, on the other hand, may be adjusted to accommodate elongated substantially horizontal workpieces of different widths.

References Cited in the file of this patent

UNITED STATES PATENTS

| | | |
|---|---|---|
| 544,158 | Cox | Aug. 6, 1895 |
| 607,219 | Collen | July 12, 1898 |
| 714,098 | Caldwell | Nov. 18, 1902 |
| 784,348 | Pye | Mar. 7, 1905 |
| 894,017 | Krebs | July 21, 1908 |
| 1,045,529 | Davis | Nov. 26, 1912 |
| 1,716,742 | Smith et al. | June 11, 1929 |
| 2,135,755 | Laushe | Nov. 8, 1938 |
| 2,253,453 | Van Deinse | Aug. 19, 1941 |
| 2,479,290 | Auxier et al. | Aug. 16, 1949 |
| 2,631,956 | Bergvall et al. | Mar. 17, 1953 |
| 2,652,870 | Dosker | Sept. 22, 1953 |
| 2,675,838 | Hickok et al. | Apr. 20, 1954 |
| 2,692,625 | Miller et al. | Oct. 26, 1954 |
| 2,823,712 | Ranta | Feb. 18, 1958 |